United States Patent
Kraft

[11] Patent Number: 5,078,182
[45] Date of Patent: Jan. 7, 1992

[54] INSULATED PIPE CONSTRUCTION

[75] Inventor: David L. Kraft, Canton, Ohio

[73] Assignee: The Babcock & Wilcox Company, New Orleans, La.

[21] Appl. No.: 433,622

[22] Filed: Nov. 7, 1989

[51] Int. Cl.⁵ .............................. F16L 9/14; E04B 1/68; F16M 13/00
[52] U.S. Cl. ...................................... 138/147; 52/573; 138/149; 248/901
[58] Field of Search .............. 138/149, 147, 140, 143, 138/155, 174; 285/45, 47, 55, 114, 187, 905; 52/267, 268, 410, 573, 724, 725, 727, 301; 248/901; 432/233, 234

[56] References Cited
U.S. PATENT DOCUMENTS

| | | | |
|---|---|---|---|
| 3,781,167 | 12/1973 | Ahonen | 138/149 |
| 3,859,040 | 1/1975 | Shefseik et al. | 138/38 X |
| 4,363,504 | 12/1982 | De Feo et al. | 285/47 |
| 4,428,730 | 1/1984 | Holmes et al. | 138/149 X |
| 4,428,991 | 1/1984 | Kamstrup-Larsen | 138/120 X |

Primary Examiner—Daniel P. Stodola
Assistant Examiner—William G. Battista, Jr.
Attorney, Agent, or Firm—Robert J. Edwards; Vytas R. Matas; Eric Marich

[57] ABSTRACT

An insulated pipe construction avoids deterioration of the refractory due to thermal cycling by supporting the refractory material against the force of gravity without restraining movement of the refractory material due to thermal expansion thereof. Excessive hoop stresses in the shell of the conduit due to thermal expansion of the refractory material can be prevented by providing a crushable layer of insulating fiber board inbetween the refractory material and the inner surface of the shell.

23 Claims, 2 Drawing Sheets

INSULATED PIPE CONSTRUCTION

BACKGROUND OF THE INVENTION

1. Field of the Invention

The present invention relates generally to insulated pipes or conduits and, in particular, to a new and novel insulated pipe construction which avoids deterioration of the insulation due to thermal cycling.

2. Description of the Related Art

In a fluidized bed boiler, there is a need to collect hot particulate matter (solids) and return the solids back to the furnace combustion zone. As shown in FIG. 1, a conduit 10 is used to transport the solids, and is typically comprised of a steel shell 12 lined internally with a multi-layer refractory composite 14. The refractory composite 14 is typically comprised of an insulating refractory layer 16 on the internal diameter (ID) or inner surface 18 of the steel shell 12 and a dense, "erosion resistant" refractory layer 20 covering the insulating refractory layer 16 and which forms a passage 21 defined by an ID 22 of the conduit 10. The hot particulate matter is conveyed within the conduit 10 in contact with the ID 22. The support for the refractory composite 14 is generally by anchors 24 welded to the ID 18 of the steel shell 12, and separate anchors 24 may be provided for each layer of refractory 16, 20.

During normal operation, high temperature solids are conveyed through the conduit 10. The temperature of the solids is in the range of 1500° F.-1800° F., but lower temperatures are possible. At temperature equilibrium, the ID 22 of the dense erosion resistant refractory 20 is at the same temperature as the hot particulate matter conveyed through the conduit 10, while an OD 26 of the steel shell 12 is typically in the range of 165° F.-225° F.

The properties of the refractory 16, 20 vary widely depending on vendor supply, application and process. However, the common properties of this construction are:

1. The insulating refractory 16 is typically cast or gunned onto the ID 18 of the steel pipe 12. However, the greater the need for insulating quality the lower the strength of the insulating refractory layer 16.

2. The dense refractory layer 20 is also typically cast or gunned. This dense refractory layer 20 has significantly higher weight and strength than the insulating refractory layer 16.

The problems with this construction are: (1) Failures of the refractory 16, 20 and (2) damage to the steel shell 12 due to overheating when the internal refractory layers fail. During start-up, the temperature of the conduit 10 increases from ambient to operating temperature. The conduit 10 is heated from the ID 22, since the solids conveyed thereby are the source of the heat. Heating causes the dense refractory 20 to expand radially and since the rate of heating of the insulating refractory 16 and the steel shell 12 lags behind the rate of heating of the dense refractory 20, the dense refractory 20 compresses the insulating refractory 16 causing stresses that exceed the crushing strength of the insulating refractory 16. Additionally, this thermal loading is transmitted to the steel shell 12, causing extremely high hoop stresses therein which could exceed the yield strength of the steel from which it is made. Successive heat-up and cool-down cycles continue the process, tending to crush the insulating refractory 16, leading to overheating and possibly yielding of the steel pipe 12.

The steel shell 12 is generally oriented vertically. When anchors 24 are the only means of vertical support against the force of gravity for the dense refractory 20, the stresses on the anchors 24 are due to bending from the cantilever loading of the refractory 16, 20 thereon. This cantilever loading on the anchors 24 increases as deterioration of the insulating refractory 16 continues. When the anchors 24 bend, the stress in the dense refractory 20 is concentrated at and along each anchor 24. This point/line tension loading on the dense refractory 20 causes cracks. Ultimately, the cracks propagate through the dense refractory 20 and pieces of the dense refractory 20 fall out, which is defined as a failure of the insulated conduit 10.

It has thus become desirable to develop an improved insulated pipe construction which avoids deterioration of the dense refractory due to thermal cycling.

SUMMARY OF THE INVENTION

The present invention provides a new and novel insulated pipe construction which minimizes or eliminates hoop stresses in the pipe due to thermal expansion of the refractory contained therein and eliminates point/line tension loading on the refractory caused by anchors.

Accordingly, one aspect of the present invention is drawn to a conduit. The conduit comprises a shell having an internal surface. A layer of refractory material is located within the shell and forms an inner passage for conveying a high temperature material therethrough. A shelf, engaged with the internal surface, is provided for supporting the refractory material within the shell against the force of gravity without restraining movement of the refractory material due to thermal expansion.

Another aspect of the present invention is drawn to a conduit comprised of a first and a second shell. Each shell has a layer of refractory material located therein and forming an inner passage therethrough for conveying a high temperature material. Each shell has a shelf, engaged with the internal surface, for supporting the refractory material within each shell against the force of gravity without restraining movement of the refractory material due to thermal expansion thereof. The first shell is stacked upon the second shell to align the inner passages of each shell and form a continuous inner passage through the shells to convey the high temperature material. Means are provided for securing the first shell to the second shell.

Another aspect of the present invention is drawn to a conduit comprising a cylindrical shell having an internal surface. A layer of refractory material within the shell forms an inner passage for conveying a high temperature material therethrough. A layer of insulating fiber board is also provided, located between the layer of refractory material and the internal surface, which crushes when the refractory material undergoes radial thermal expansion to prevent excessive hoop stresses in the shell. Finally, an annular shelf is provided for supporting the refractory material within the shell against the force of gravity without restraining radial movement of the refractory material due to thermal expansion.

The various features of novelty which characterize the present invention are pointed out with particularity in the claims annexed to and forming a part of this disclosure. For a better understanding of the present invention, its operating advantages and specific results attained by its uses, reference is made to the accompanying drawings and descriptive matter in which a preferred embodiment of the present invention is illustrated.

DESCRIPTION OF THE PREFERRED EMBODIMENTS

Figure 1:
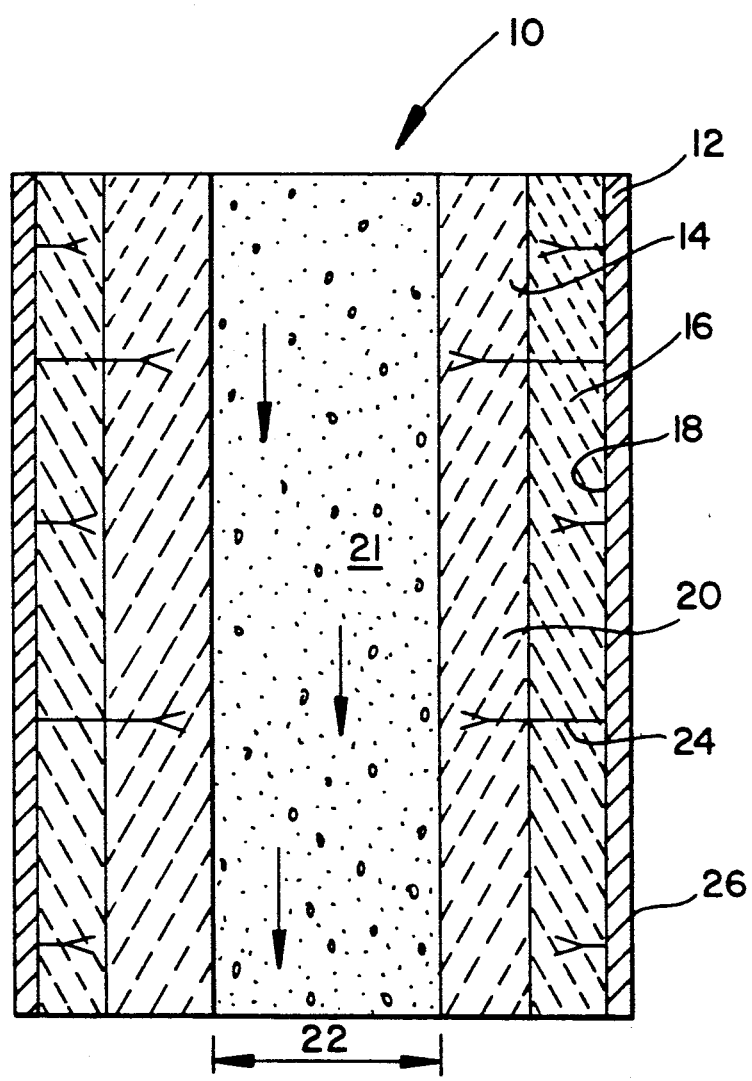
FIG. 1 is a sectional view through a typical insulated conduit of the prior art.
Figure 2:
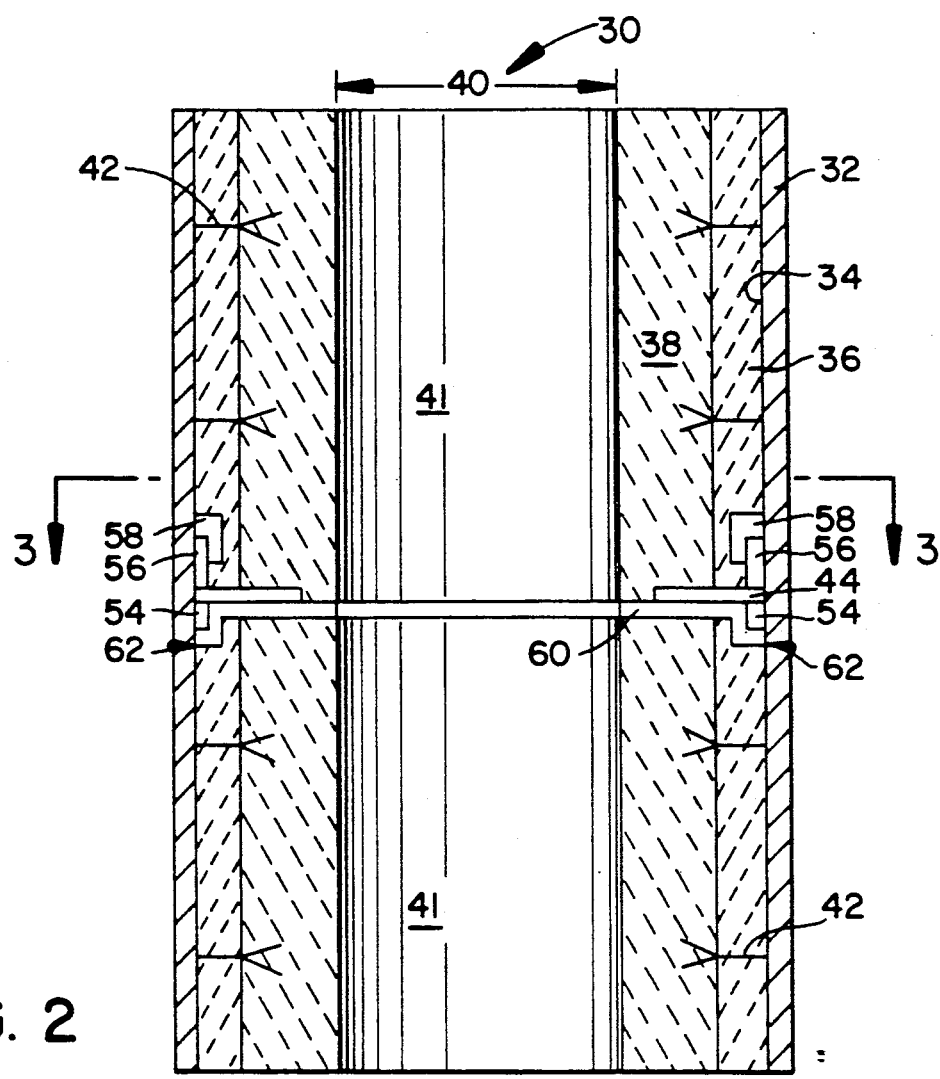
FIG. 2 is a sectional view through two sections of insulated conduit according to the present invention, stacked one on top of the other.
Figure 3:
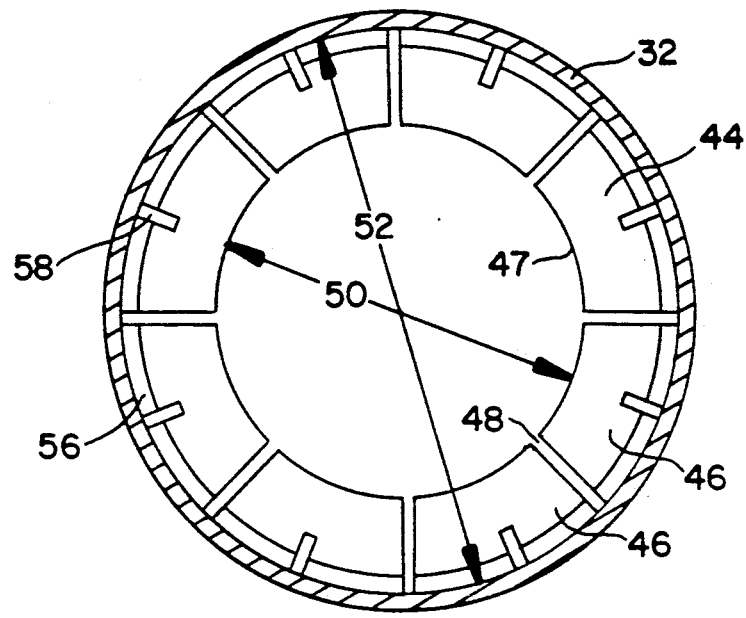
FIG. 3 is a sectional view taken along line 3—3 of FIG. 2, where the insulating material has been omitted for clarity.

Referring to the drawings generally and to FIGS. 2 and 3 in particular, wherein like numerals designate the same or similar elements throughout the several drawings, there is shown a conduit 30 for conveying a high temperature particulate material therethrough. It is understood that while the conduit 30 would typically be cylindrical in cross-section, and the following discussion employs terms indicative thereof, such terminology is used only by way of example and not by way of limitation to describe the preferred embodiments. Other geometric cross-sections could be used while still being within the spirit and scope of the present invention.

The conduit 30 is comprised of a pipe or shell 32 having an internal diameter (ID) or inner surface 34. The shell 32 is generally made of carbon steel. However, instead of the layer of insulating refractory 16 of the prior art, a layer of insulating fiber board 36 is placed on the inner surface 34 of the shell 32. The insulating fiber board 36 is made from a material according to ASTM C 612 Class 5 HT block so that it readily deforms when a load is applied to the surface thereof. One supplier of such a material is US Gypsum under the name K-FAC 19. An inner layer of dense erosion-resistant refractory 38 is applied inside of and on top of the layer of insulating fiber board 36, to provide an inner surface 40. The inner surface 40 defines a passage 41 through which the high temperature material is conveyed.

The layer of dense refractory 38 is advantageously a fused silica product. One supplier of such a material is North American Refractories Company under the name HPV-SX. This material has good insulating properties for a dense refractory but it is chosen primarily for its shock resistance and erosion resistance properties. Upon heating, the layer of dense refractory 38 will expand, loading and compressing the layer of fiber board 36 between the layer of dense refractory 38 and the inner surface 34 of the shell 32. However, the deformable nature of the layer of insulating fiber board 36 allows these thermally induced applied loads to simply crush the layer of insulating fiber board 36, absorbing the thermally induced loading. As a result, the pressure loads actually applied to the inner surface 34 of the shell 32 are reduced to a negligible level or eliminated altogether, and excessive hoop stresses in the shell 32 are avoided.

Support for the layer of dense refractory 38 against the force of gravity must still be provided, however, to eliminate the point/line tension loading on the layer of dense refractory 38 caused by bending of anchors 42. To accomplish this, an annular shelf 44 is provided to support the layer of dense refractory 38 against the force of gravity. Anchors 42 are still used to manufacture the conduit 30, and to "key" the layer of dense refractory 38 together should cracks still develop therein due to thermal cycling. The annular shelf 44 allows the layer of dense refractory 38 to expand and contract during temperature cycles, without restraining movement thereof, thereby avoiding tensile stresses which could cause the layer of dense refractory 38 to fail.

The annular shelf 44 is comprised of a plurality of separate annular segments 46 having a thickness t and a width w and separated from one another by expansion gaps 48. The annular segments 46 are generally made of stainless steel. The expansion gaps 48 are relatively equally spaced about the periphery of the annular shelf 44. An ID 50 defined by the annular segments 46 is chosen to be slightly greater than that of the ID 40 defining the Passage 41 through which the high temperature material is conveyed. By this construction, tips 47 of the annular segments 46 are not exposed to the high temperature of the material being conveyed in the passage 41, the tips 47 being covered by the layer of dense refractory 38. Viewed from a heat transfer perspective, the annular segments 46 act like an extended surface fin whose overall design temperature increases the closer the tip 47 of each annular segment 46 comes to the passage 41 of the conduit 30. By keeping the tips 47 of the annular segments 46 covered by the layer of dense refractory 38, heat transfer to the annular segments 46 is reduced thereby lowering the design temperature of the annular segments 46.

During normal operation, the temperature at the ID 50 of the annular shelf 44 can be nearly 1000° F. while the temperature at an OD 52 of the annular shelf 44 would be only about 350° F. This severe temperature differential would cause the annular shelf 44 to bend into a cone shape, much like a BELLEVILLE washer, were it not for the presence of the expansion gaps 48 which divide the annular shelf 44 into the plurality of annular segments 46. This bending would cause the layer of dense refractory 38 to move, applying a load to the anchors 42 which would cause cracking of the layer of dense refractory 38. However, the expansion gaps 48 prevent the aforementioned cone-shaped bending of the annular shelf 44.

Shear lugs 54, welded or otherwise affixed to the inner surface 34 of the shell 32, transmit the load on the annular shelf 44, due to the weight of the layer of dense refractory 38 and layer of insulating fiber board 36, to the shell 32. The number of shear lugs 54 is determined by the load to be supported; the shear lugs are also generally made of carbon steel. To prevent each of the annular segments 46 from rotating inwardly, a curved plate 56 is welded or otherwise affixed along the outer periphery at the OD 52 of each of the annular segments 46. This creates an "L-shape" in cross section being formed by the curved plate 56 and each annular segment 46. Alternatively, the annular segments 46 and curved plate 56 could be fabricated together as a single, one-piece member. Right angle clips 58 are welded to the inner surface 34 of the shell 32 above the curved plate 56, but they are not welded or affixed to the curved plate 56. The right angle clips 58 engage the curved plate 56, thereby transmitting the rotational load on each annular segment 46 to the shell 32, and are also generally made of carbon steel.

The annular segments 46 rest in an unrestrained fashion upon the shear lugs 54, "tied" to the shell 32 with only one right angle clip 58 for each annular segment 46. By utilizing only one right angle clip for each annular segment 46, and by placing each right angle clip 58 generally in the middle of each annular segment 46, binding of each annular segment 46 is prevented when the thermal expansion occurs. Placing two or more clips on each annular segment 46 tends to bind the annular segment 46 when it is heated causing it to warp. The present construction allows for movement of the annular segments 46 horizontally/radially in an unrestrained fashion due to the thermally induced expansions, thus nearly eliminating any warping or unwanted movement of the annular segments 46. As a result, movement of the layer of dense refractory 38 supported thereby is prevented and the aforementioned point/line loading by the anchors 42 that normally produces cracking in the layer of dense refractory 38 is prevented. Additionally, there is no need for any dissimilar metal welds between the annular segments 46 and the shell 32, right angle clips 58 or shear lugs 54. Eventually, the thermal cycles may cause the layer of dense refractory 38 to crack but the anchors 42 will hold the pieces together for a much longer period of time, since the layer of dense refractory 38 is supported by the annular shelf 44.

As indicated previously, the annular shelf 44 is divided into a plurality of annular segments 46, separated from one another by expansion gaps 48. The choice of the exact number of annular segments 46 is a function of several factors. While FIGS. 2 and 3 show eight annular segments, fewer annular segments 46 can be employed, and in such a design each annular segment 46 will carry a larger proportional part of the weight of the layer of dense refractory 38. The thickness t of each radial segment 46 is set by calculations of the bending stress at the intersection of the curved plate 56 with each annular segment 46. It is generally preferred that the width w of each annular segment 46 be approximately ⅜ths of the thickness of the layer of dense refractory 38 that will be supported thereby. Since only one right angle clip 58 is preferred for each annular segment 46, providing fewer but larger annular segments 46 will require larger and stronger clips 58 to prevent rotation of each of the annular segments 46. This can only be done up to a point, since the rotational load is eventually transmitted to the wall of the shell 32 at the affixation point of each right angle clip 58 to the inner surface 34 of the shell 32. If the load on each annular segment 46 becomes too great, the transmitted load to the shell 32 will cause localized kinking or deformation of the wall of the shell 32. Additionally, using fewer annular segments 46 increases the possibility that they will deform into a cone-shape when subjected to the thermal heating cycles. This is unacceptable since it will tend to move the layer of dense refractory 38 causing the aforementioned destructive point/line loading of the anchors 42 onto the layer of dense refractory 38.

Testing was performed on fabricated sections incorporating the teachings of the present invention. Two insulated 4 foot high sections each having a 30 inch ID inner passage and a 54 inch OD carbon steel shell were stacked vertically in a test stand. A burner was attached to the bottom to fire the sections with a thermocouple located on the outlet to control the firing rate. A series of 24 tests was conducted in which the ID 40 of the layer of dense refractory 38 was heated from ambient temperatures to 1600° F. The number of cycles simulated 5 to 10 years of actual cycles on a boiler, and the rate of temperature increase nearly simulated the conditions of an actual boiler start-up.

The ID 40 of the dense refractory 38 was visually examined after each temperature cycle, and after the test series one of the fabricated sections was destructively examined. The results showed no cracking of the layer of dense refractory 38 due to expansion of the annular shelf 44, or due to point/line loading of the anchors 42 on the layer of dense refractory 38. The annular segments 46 of the annular shelf 44 showed no signs of warping or displacement even though there was a 350° F. to 1000° F. temperature differential across the width w of the annular segments 46 combined with the gravity loading of the refractory mass thereon. The annular segments 46 remained perpendicular to the curved plates 56, expanding freely without inducing shear forces on the layer of dense refractory 38, and the anchors 42 were not loaded by bending forces. As a result, a nearly crack free layer of dense refractory 38 was preserved.

Commercially, the advantage of such an insulated pipe construction is decreased maintenance costs. The typical life expectancy of the prior art construction is only 1-2 years before total replacement of the refractory composite 14 is expected. The projected life expectancy of the present design is 5-10 years based upon the test data. The insulated pipe construction of the present invention can be easily modularized into sections of any convenient length, each section being stacked upon an adjacent section. An expansion joint 60 using a gasket preferably made of KAOWOOL or other similar material would be placed between each section and a girth weld 62 would secure one section to another. By prefabricating these sections, downtime of the boiler is minimized and lost production costs are greatly reduced.

While a specific embodiment of the present invention has been shown and described in detail to illustrate the application of the principles of the invention, certain modifications and improvements will occur to those skilled in the art upon reading the foregoing description. For example, while the present invention has been described as being especially suitable for application to vertical conduits, the advantages of the present invention can also be realized in any conduit where support of the layers of insulating material contained therein can be effected by the support means of the present invention. Similarly, while the term "dense" refractory has been used to describe the material through which the high temperature material is conveyed, it is understood that "insulating" refractories characterized by their light weight, low density and low strength could also be utilized if the erosion resistant properties of a "dense" refractory were not essential. Thus, while particular application of the present insulated pipe construction is for use in the conveying of high temperature material such as is encountered in fluidized bed combustion boilers, the present invention can be used in any application where a hot gaseous or fluid medium alone or in combination with high temperature particulate material is conveyed via an insulated conduit. Accordingly, it is thus understood that all such modifications and improvements have been deleted herein for the sake of conciseness and readability but are properly within the spirit and scope of the following claims.

What is claimed as new and desired to be secured by Letters Patent of the United States is:

1. A conduit, comprising:
a shell having an internal surface;
a layer of insulating material located within said shell and forming an inner passage for conveying a high temperature material therethrough;
means for preventing excessive hoop stresses in said shell due to thermal expansion of said insulating material, located between said layer of insulating material and said internal surface;
a shelf having a plurality of separate segments separated from one another by expansion gaps, engaged with said internal surface and supported by shear lugs attached to said internal surface, for supporting said insulating material within said shell against the force of gravity without restraining movement of said insulating material due to thermal expansion thereof; and
means for preventing rotation of said segments about said shear lugs.

2. The conduit of claim 1, wherein said means for preventing rotation of said segments about said shear lugs comprises a plurality of plates attached to an outer periphery of each of said segments to form an L-shape in cross-section and a plurality of right angle clips, one for each of said plates, attached to said internal surface for engaging said plates.

3. The conduit of claim 1, wherein said means for preventing excessive hoop stresses in said shell due to thermal expansion of said insulating material comprises a layer of insulating fiber board which crushes when said insulating material undergoes thermal expansion.

4. The conduit of claim 1, further including means for keeping the insulating material together if cracks develop in said insulating material.

5. The conduit of claim 4, wherein said means for keeping the insulating material together comprises anchors attached to said internal surface and imbedded in said insulating material.

6. The conduit of claim 1, wherein said shell is cylindrical in cross-section.

7. The conduit of claim 1, wherein said shelf is an annular shelf.

8. The conduit of claim 1, wherein said segments are annular segments.

9. A conduit, comprising:
a first and a second shell, each shell having an internal surface, a layer of insulating material located therein and forming an inner passage therethrough for conveying a high temperature material, means for preventing excessive hoop stresses in said shell due to thermal expansion of said insulating material, said means being located between said layer of insulating material and said internal surface, and a shelf, engaged with said internal surface and supported by shear lugs attached to said internal surface, and having a plurality of separate segments separated from one another by expansion gaps for supporting said insulating material within each shell against the force of gravity without restraining movement of said insulating material due to thermal expansion thereof, said first shell being stacked upon said second shell to form a continuous inner passage through said shells;
means for preventing rotation of said segments about said shear lugs; and
means for securing said first shell to said second shell.

10. A conduit according to claim 9, wherein said means for securing said first shell to said second shell comprise a gasket placed between said first and second shells and a girth weld connecting said first shell to said second shell.

11. The conduit of claim 9, wherein said means for preventing excessive hoop stresses in said shell due to thermal expansion of said insulating material comprises a layer of insulating fiber board which crushes when said insulating material undergoes thermal expansion.

12. The conduit of claim 9, wherein said means for preventing rotation of said segments about said shear lugs comprises a plurality of plates attached to an outer periphery of each of said segments to form an L-shape in cross-section and a plurality of right angle clips, one for each of said plates, attached to said internal surface for engaging said plates.

13. A conduit, comprising:
a cylindrical shell having an internal surface;
a layer of refractory material within said shell and forming an inner passage for conveying a high temperature material therethrough;
a layer of insulating fiber board, located between said layer of refractory material and said internal surface, which crushes when said refractory material undergoes radial thermal expansion to prevent excessive hoop stresses in said shell; and
an annular shelf, having a plurality of separate annular segments separated from one another by expansion gaps and supported by shear lugs attached to said internal surface, for supporting said refractory material within said shell against the force of gravity without restraining radial movement of said refractory material due to thermal expansion thereof; and
a plurality of curved plates attached to an outer periphery of each of said annular segments to form an L-shape in cross-section and a plurality of right angle clips, one for each of said curved plates, attached to said internal surface for engaging said plates, for preventing rotation of said segments about said shear lugs.

14. The conduit of claim 13, wherein said annular segments and said curved plates are fabricated together as a single, one-piece member.

15. A conduit, comprising:
a shell having an internal surface;
a layer of insulating material located within said shell and forming an inner passage for conveying a high temperature material therethrough;
a shelf having a plurality of segments separated from one another by expansion gaps, engaged with said internal surface and supported by shear lugs attached to said internal surface, for supporting said insulating material within said shell against the force of gravity without restraining movement of said insulating material due to thermal expansion thereof; and
means for preventing rotation of said segments about said shear lugs.

16. The conduit of claim 15, wherein said means for preventing rotation of said segments about said shear lugs comprises a plurality of plates attached to an outer periphery of each of said segments to form an L-shape in cross-section and a plurality of right angle clips, one for each of said plates, attached to said internal surface for engaging said plates.

17. A conduit, comprising:
a cylindrical shell having an internal surface;

a layer of refractory material within said shell and forming an inner passage for conveying a high temperature material therethrough;

a layer of insulating fiber board, located between said layer of refractory material and said internal surface, which crushes when said refractory material undergoes radial thermal expansion to prevent excessive hoop stresses in said shell;

an annular shelf having a plurality of separate annular segments separated from one another by expansion gaps, said annular segments supported by shear lugs attached to said internal surface, said shelf for supporting said refractory material within said shell against the force of gravity without restraining radial movement of said refractory material due to thermal expansion thereof; and means for preventing rotation of said annular segments about said shear lugs.

18. The conduit of claim 17, wherein said means for preventing rotation of said segments about said shear lugs comprises a plurality of curved plates attached to an outer periphery of each of said annular segments to form an L-shape in cross-section and a plurality of right angle clips, one for each of said curved plates, attached to said internal surface for engaging said plates.

19. The conduit of claim 18, wherein said annular segments and said curved plates are fabricated together as a single, one-piece member.

20. A conduit, comprising:

a shell having an internal surface;

a layer of insulating material located within said shell and forming an inner passage for conveying a high temperature material therethrough;

a shelf, engaged with said internal surface, for supporting said insulating material within said shell against the force of gravity without restraining movement of said insulating material due to thermal expansion thereof, said shelf having a plurality of separate segments separated from one another by expansion gaps;

means, attached to said internal surface, for supporting said shelf; and means for preventing rotation of said segments about said shelf supporting means, said rotation preventing means including a plurality of plates attached to an outer periphery of each of said segments to form an L-shape in cross-section and a plurality of right angle clips, one for each of said plates, attached to said internal surface for engaging said plates.

21. The conduit of claim 20, further including means for preventing excessive hoop stresses in said shell due to thermal expansion of said insulating material.

22. The conduit of claim 21 wherein said means for preventing excessive hoop stresses in said shell due to thermal expansion of said insulating material comprises a layer of insulating fiber board, located between said layer of insulating material and said internal surface, which crushes when said insulating material undergoes thermal expansion.

23. The conduit of claim 20 wherein said segments and said plates are fabricated together as a single, one-piece member.

* * * * *